United States Patent [19]

Sullivan

[11] 4,084,492
[45] Apr. 18, 1978

[54] SYSTEM FOR PROVIDING LIKE COOKING MEDIUM VOLUME IN SUCCESSIVE COOKING CYCLES

[75] Inventor: Neal Sullivan, Nashville, Tenn.

[73] Assignee: KFC Corporation, Louisville, Ky.

[21] Appl. No.: 620,560

[22] Filed: Oct. 8, 1975

[51] Int. Cl.² .............................................. A47J 27/66
[52] U.S. Cl. ....................................... 99/330; 99/407; 137/393
[58] Field of Search .................. 99/410, 408, 407, 403, 99/330; 137/393; 210/167, DIG. 8

[56] References Cited
U.S. PATENT DOCUMENTS

| 2,643,670 | 6/1953 | Bryant | 137/393 |
|---|---|---|---|
| 2,978,975 | 4/1961 | Rossi | 99/330 |
| 3,431,834 | 3/1969 | Keathley | 99/410 |
| 3,608,472 | 9/1971 | Pelster | 99/408 |

*Primary Examiner*—Harvey C. Hornsby
*Assistant Examiner*—Robert Pous
*Attorney, Agent, or Firm*—Watson, Leavenworth, Kelton & Taggart

[57] ABSTRACT

A preselected volume of a liquified cooking medium is supplied to a continuous-flow system serving a cooking chamber. In the course of heating the supplied cooking medium prior to the cooking cycle, an overflow device is operative to remove that volume of the thus expanded cooking medium in excess of the preselected volume. On commencement of the cooking cycle, the overflow device is rendered inoperative.

13 Claims, 4 Drawing Figures

SYSTEM FOR PROVIDING LIKE COOKING MEDIUM VOLUME IN SUCCESSIVE COOKING CYCLES

FIELD OF THE INVENTION

This invention relates to the cooking of food parts and more particularly to promoting consistency as between food parts cooked in separate cooking operations.

BACKGROUND OF THE INVENTION

In the preparation of food products in separate cooking operations, various parameters are recognized as requiring relatively close tolerance to provide cooked products having appearance and taste characteristics within desired limits. In seeking after such product quality control, the industry has heretofore directed efforts to improvements in control of cooking medium temperature and to containment of the cooking medium to prevent contamination as in continuous-flow (recirculating) systems shown in U.S. Pat. No. 3,608,472 to Pelster et al. Further, the art has looked to on-line filtration of the cooking medium, i.e., during cooking operations.

SUMMARY OF THE INVENTION

The present invention has as its object the control of a further parameter affecting the constancy of characteristics of products cooked separately in continuous-flow cooking apparatus. Specifically, the invention is directed to providing a like volume of cooking medium at the outset of each of successive cooking cycles.

In attaining this and other objects, the invention supplies a preselected volume of liquified cooking medium to continuous-flow cooking apparatus at a time prior to energizing the principal heaters thereof. In the course of energizing these heaters to elevate the cooking liquid temperature to its cooking level, and attendant expansion of the liquid, the system of the invention removes cooking liquid in volume exceeding the preselected volume. At the time of commencement of the cooking operation, the cooking liquid removal is discontinued. There results a consistency in cooking medium volume at the outset of each cooking operation irrespective of both the temperature at which the liquid is supplied and the level of cooking temperature at the outset of the cooking operation.

The foregoing and other objects and features of the invention will be evident from the following detailed description of the preferred embodiment thereof and from the drawings wherein like reference numerals identify like parts throughout.

DESCRIPTION OF THE PREFERRED EMBODIMENT

Figure 1:
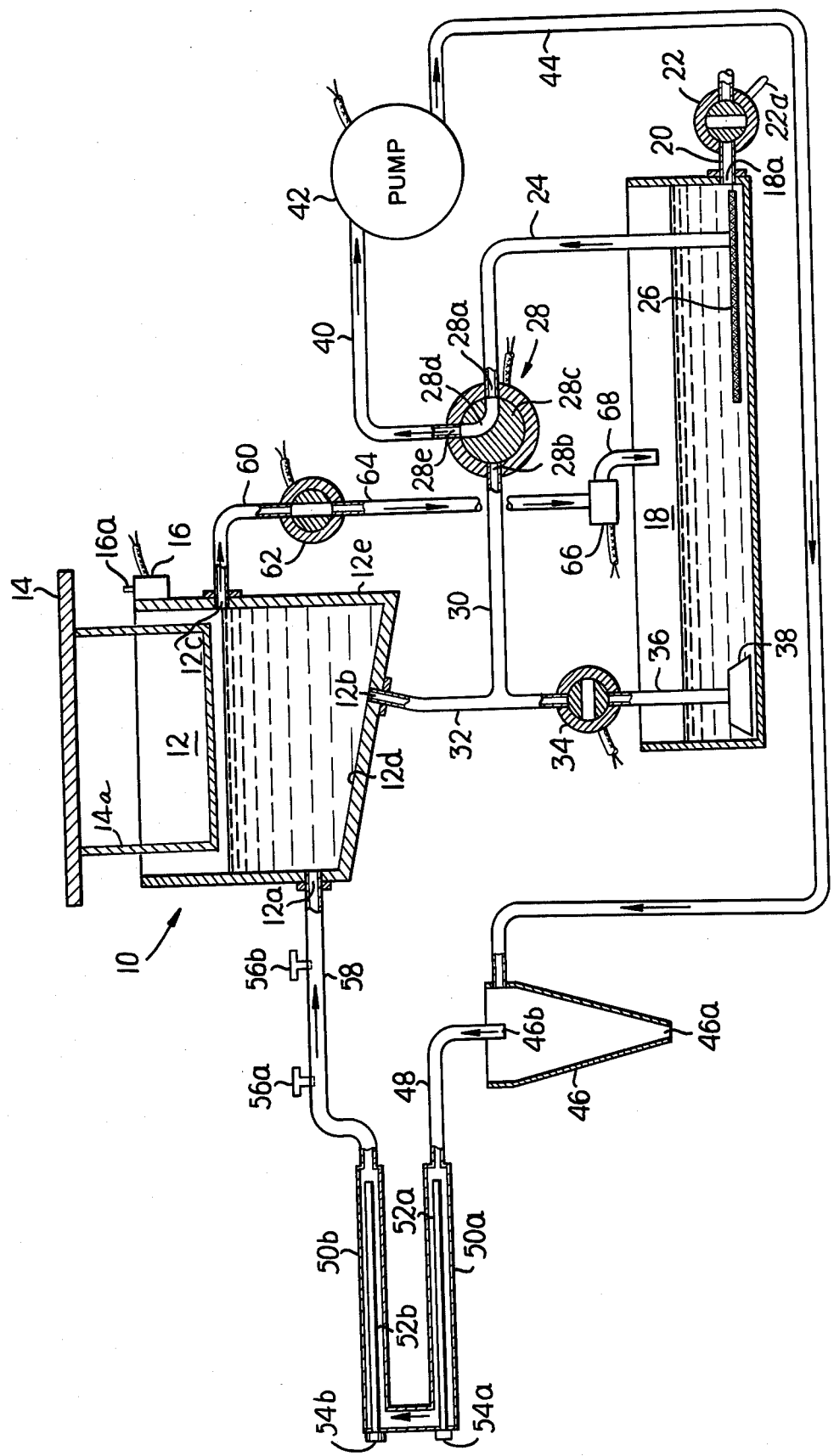
FIGS. 1-3 show a system in accordance with the invention in successive stages of operation.

Referring to FIG. 1 cooking chamber 10 includes a pot 12 and closure lid 14 therefor, both being comprised of material such as stainless steel. Pot 12 has inlet 12a, outlet 12b and overflow port 12c situated at a preselected height upwardly of pot floor 12d. On sidewall 12e, pot 12 supports switch member 16 having an actuator 16a extending upwardly of the open mouth of the pot in position to be operated by lid 14 on closure of the pot thereby.

Lid 14 is preferably lowered and raised by an electrically-operated drive, such as the jack-screw mechanism shown in the above-referenced Pelster et al. patent and as also shown in such patent, includes a rack assembly 14a depending from the lid for receiving food parts to be immersed in the cooking liquid.

Filter tank 18 serves as a reservoir for cooking liquid and has a drainage port 18a for discharging its contents through conduit 20 and drain valve 22, operable by handle 22a. Conduit 24 extents outwardly of tank 18 for conveying cooking liquid strained by filter 26 to one inlet 28a of motor-operated valve 28. Valve 28 has a further inlet 28b communicating with conduit 30, the latter being arranged as a branch of conduit 32 which communicates at one end with pot outlet 12b and at its other end with motor-operated drain valve 34. Conduit 36 extends from valve 34 into tank 18 with baffle plate 38 being provided to prevent splashing of the cooking medium on its issuance into tank 18.

Valve 28 includes a rotatable spool 28c defining a passage 28d providing communication between inlet 28a and outlet 28e when the valve is in first (unenergized) state as in FIG. 1. Under this condition conduit 24 services conduit 40 connected between valve outlet 28e and the inlet of pump 42. The pump outlet communicates with conduit 44.

Conduit 44 terminates in cyclone or vortex filter 46 which discharges at its drawoff-outlet 46a rejects, in the case of chicken cooking, such as large pieces of cracklings which may be entrained in the stream of cooking liquid. A collector tank (not shown) is suitably connected to drawoff-outlet 46a. Conduit 48 extends from filter through-outlet 46b to heating conduits 50a and 50b which support elongate principal heater elements 52a and 52b energizable through terminal members 54a and 54b by suitable temperature control apparatus (not shown) responsive to thermostats 56a and 56b in conduit 58 terminating at pot inlet 12a.

Conduit 60 extends from pot overflow port 12c to motor-operated valve 62 which services conduit 64. Conduit 64 extends to flow sensor 66 which issues into tank 18 through conduit 68. In FIG. 1 valve 62 is shown in first (energized) state providing communication between conduits 60 and 64.

On closure of a system on-off switch, and with lid 14 raised and heaters 52a and 52b and valve 28 unenergized, pump 42, valve 34 and valve 62 are energized and accordingly in states shown in FIG. 1. Under these conditions, cooking liquid is drawn from tank 18, through conduit 24, valve inlet 28a, passage 28d and valve outlet 28e to conduit 40 whence it is pumped into pot 12 through conduit 44, filter 46, conduits 48, 50a, 50b and 58 and pot inlet 12a. With conduits 32 and 36 mutually isolated by energized valve 34 as shown, and conduits 30 and 40 likewise mutually isolated by reason of the setting of valve 28 in its FIG. 1 state, pot 12 fills to the broken line volume level in FIG. 1 with any volume of cooking liquid in excess thereof spilling through overflow port 12c through conduit 60, energized valve 62, conduit 64, sensor 66 and conduit 68 into tank 18.

By control circuitry discussed below, valve 28 is switched to its energized state shown in FIG. 2 upon sensing of fluid flow by sensor 66. Communication through valve 28 between conduits 24 and 40 is thereby discontinued, terminating the phase of operation in which a preselected volume of cooking liquid is supplied from tank 18 to the continuous-flow system shown in FIG. 2.

Figure 2:
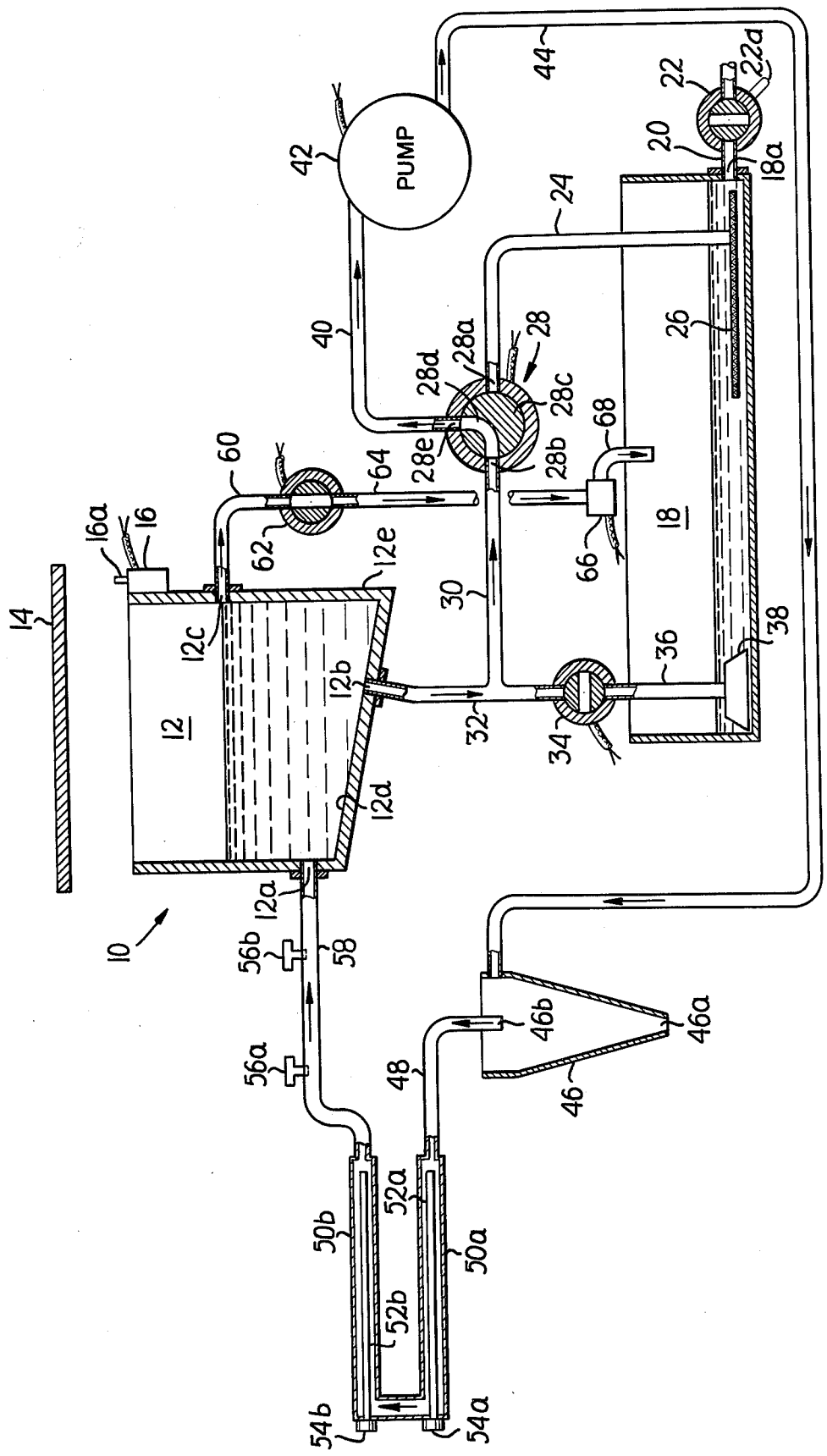

In FIG. 2, cooking liquid supplied in the foregoing phase is continuously circulated by pump 42 through the fluid circuit comprising conduit 44, filter 46, conduits 48, 50a, 50b and 58, pot inlet 12a, pot outlet 12b, conduits 32 and 30, valve inlet 28b, passage 28d, valve outlet 28e and conduit 40.

As valve 28 is switched to its FIG. 2 state, heaters 52a and 52b are energized. In the course of heating of the cooking liquid thereby, the liquid expands giving rise to spillage through overflow port 12c, conduit 60, energized valve 62, conduit 64, sensor 66 and conduit 68. The cooking liquid is elevated to a predetermined temperature whereupon a display device responsive to thermostats 56a and 56b apprises an operator of the occurrence of this condition.

Figure 3:
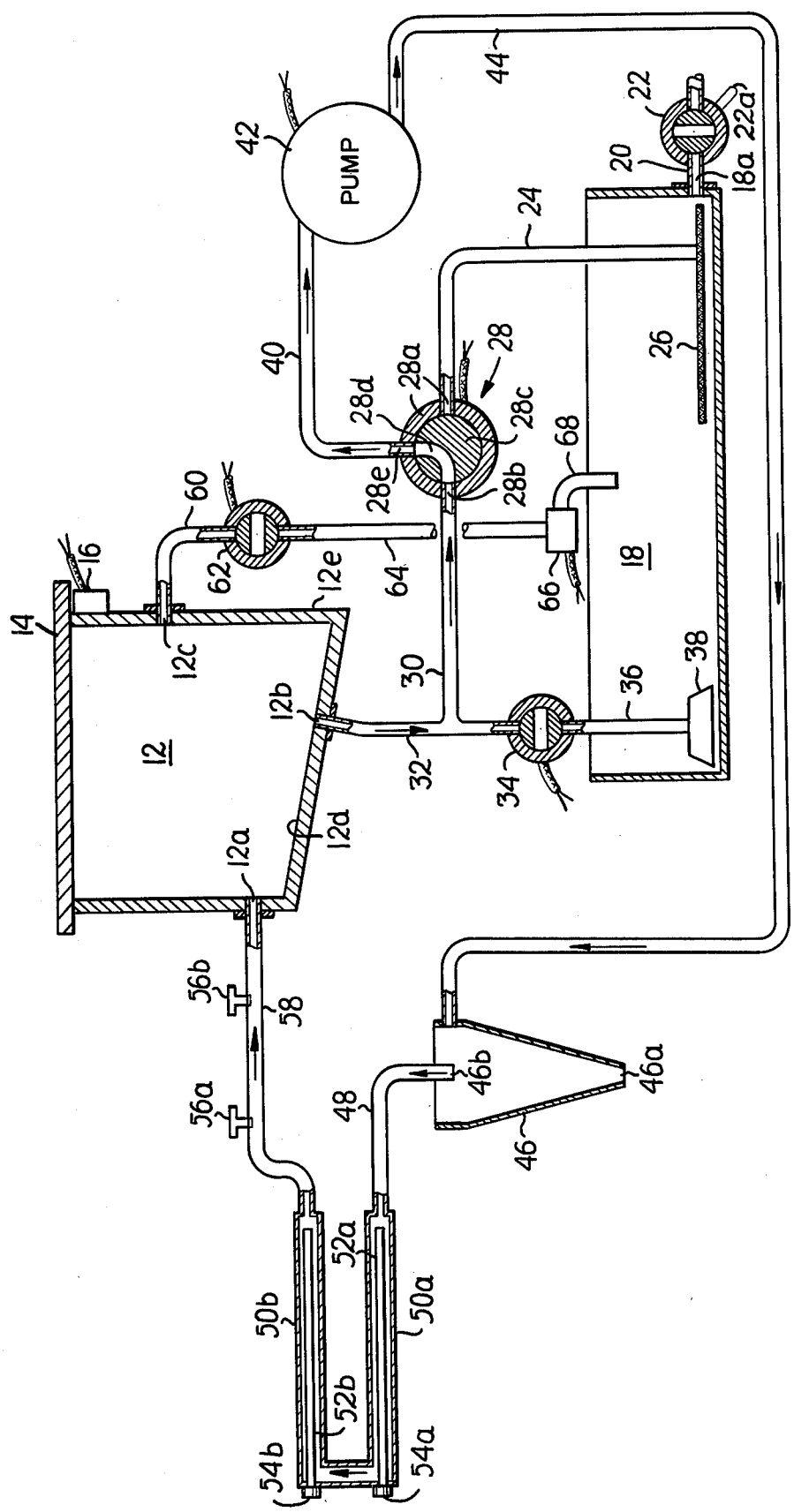

At this juncture, lid 14 is closed, immersing uncooked food parts in the cooking liquid. Switch member 16 is operated by depression of actuator 16a. This shifts the system to a further phase, i.e., a cooking operation, shown in FIG. 3, wherein valve 62 is deenergized and this valve assumes its FIG. 3 state, discontinuing communication between conduits 60 and 64 and preventing spillage of cooking liquid into tank 18.

Upon completion of the cooking operation, the system on-off switch is opened, lid 14 is raised and the cooked food parts are removed therefrom. Upon opening of the on-off switch, pump 42 and valve 28 are deenergized and the latter reverts to its FIG. 1 state. Valve 34 is also deenergized, providing for return of cooking liquid to tank 18 through conduits 32 and 36. The system is thereby reset for the next cycle.

The controlled events of the discussed cycle are (1) in a first phase, energization of pump 42, valve 34 and valve 62, (2) in a second phase, continued energization of pump 42, valve 34 and valve 62 and energization of valve 28 on flow sensing by sensor 66, (3) in a third phase, continued energization of pump 42 and valve 28 and deenergization of valve 62 on closure of lid 14 and (4) in a final phase, i.e., on completion of the third phase, reversion of pump 42 and valves 28 and 34 to unenergized states.

Figure 4:
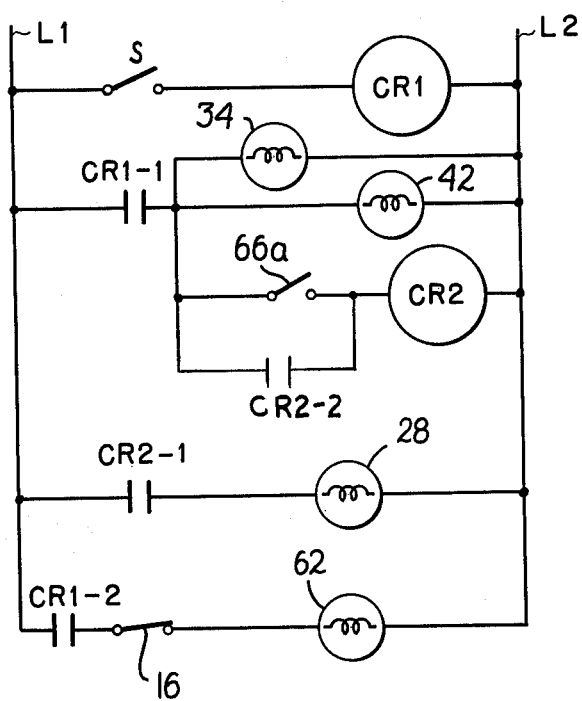
FIG. 4 is an electrical schematic diagram of a control circuit for the system of FIGS. 1-3.

A control circuit for implementing these functions is shown in FIG. 4. System on-off switch S is series-connected with the coil of relay CR1 between power lines L1 and L2. Contacts CR1-1 of relay CR1 are series-connected between L1 and L2 with both the armatures of the motors of pump 42 and valve 34. Contacts CR1-1 are further series-connected between L1 and L2 with switch 66a of sensor 66 and the coil of relay CR2. Contacts CR2-1 of relay CR2 and the armature of the motor of valve 28 comprise another branch circuit across L1 and L2. Contacts CR2-2 of relay CR2 are connected in parallel with switch 66a. A further branch circuit includes contacts CR1-2 of relay CR1, normally-closed switch member 16 and the armature of the motor of valve 62.

In operation of the FIG. 4 control circuit, switch S is closed and the coil of relay CR1 is connected across L1 and L2. With contacts CR1-1 thereby closed, the armatures of the motors of pump 42 and valve 34 are also connected across L1 and L2 whereby the pump is operated and valve 34 set to its energized (FIG. 1) state. The armature of the motor of valve 62 is also connected across L1 and L2 through contacts CR1-2 and switch member 16 whereby valve 62 is set to its energized (FIG. 1) state.

As sensor switch 66a is closed on flow of cooking liquid through pot overflow port 12c, the coil of relay CR2 is connected across L1 and L2 and the armature of the motor of valve 28 is connected across L1 and L2 through now-closed contacts CR2-1, causing valve 28 to assume its energized (FIG. 2) state.

As lid 14 is closed, switch member 16 is opened and connection of the armature of the motor of valve 62 across L1 and L2 is discontinued, whereupon valve 62 assumes its unenergized (FIG. 3) state. Discontinuance of flow through sensor 66 and opening of switch 66a has no effect on continued connection of the armature of the motor of valve 28 across L1 and L2 since the coil of relay CR2 is latched in energized state by contacts CR2-2.

At the end of the cooking cycle, switch S is opened, discontinuing connection of the coils of relays CR1 and CR2 across L1 and L2, in turn deenergizing pump 42, and causing valves 34 and 28 to revert to their unenergized states.

The invention may be understood more broadly and generally by considering that the system at hand provides for selectively conducting cooking liquid from a supply to a cooking pot or other vessel, for issuing from the vessel liquid supplied thereto in volume exceeding a predetermined amount, for interrupting communication between the vessel and the supply and then recirculating the supplied liquid through the vessel while continuing such liquid issuance during heating thereof, and for discontinuing such liquid issuance from the vessel upon containment of food parts therein.

Various changes may evidently be introduced in the disclosed structure to accomplish these functions without departing from the spirit of the invention. It is thus to be appreciated that the particularly disclosed preferred embodiment of the invention is intended in an illustrative and not in a limiting sense. The true spirit and scope of the invention is set forth in the following claims.

What is claimed is:

1. A system for use in cooking food parts comprising:
   (a) a source containing cooking liquid;
   (b) a cooking chamber having an inlet, an outlet and an overflow port for issuing from said chamber cooking liquid in volume exceeding a preselected volume;
   (c) first conduit means connected between said chamber inlet and outlet and including means for pumping cooking liquid and first valve means having a first state providing flow of cooking liquid from said source to said chamber and settable to alternate second state for recirculating cooking liquid from said chamber outlet to said chamber inlet;
   (d) second conduit means including second valve means connected between said overflow port and said source, said second valve means having a first state providing flow of said cooking liquid therethrough and settable to alternate second state for discontinuing flow of cooking liquid therethrough, and sensor means operated upon flow of cooking liquid through said second valve means; and
   (e) control means for setting said first valve means in said second state thereof upon operation of said sensor means and including switch means connected to said second valve means for setting said second valve means in said second state thereof.

2. The system claimed in claim 1 wherein said first valve means provides flow of cooking liquid from said chamber outlet to said pumping means in said second state and blocks flow of cooking liquid from said chamber outlet in said first state.

3. The system claimed in claim 1 wherein said first conduit means further includes means for filtering cooking liquid flowing therethrough.

4. The system claimed in claim 1 further including a closure member for said chamber, said chamber supporting said switch means for operation thereof by said closure member on such chamber closing.

5. The system claimed in claim 1 wherein said first conduit means includes electrical heater means for heating said cooking liquid and temperature-responsive means for detecting the temperature of said cooking liquid.

6. The system claimed in claim 1 wherein said source includes means for filtering said cooking liquid, said first conduit means including a branch extending from said source filtering means to said first valve means.

7. A system for use in cooking food parts comprising:
    (a) a source containing cooking liquid;
    (b) cooking chamber means for containing food parts and providing output indication on commencement of a cooking operation;
    (c) first means connected between said source and said chamber means and operable in first state for supplying cooking liquid from said source to said chamber means and in alternate second state for recirculating through said chamber means cooking liquid supplied thereto;
    (d) second means connected between said source and said chamber means and operable in first state for removing from said chamber means cooking liquid supplied thereto in volume exceeding a preselected volume and in alternate second state for discontinuing such removal of cooking liquid from said chamber means;
    (e) liquid flow sensor means for providing output indication of liquid flow through said second means; and
    (f) control means for operating said first and second means jointly in said first states thereof, and responsive to said output indication of said liquid flow sensor means for then operating said first means in said second state upon supply of cooking liquid to said chamber means in volume exceeding said preselected volume while continuing operation of said second means in said first state and for then operating said first and second means jointly in said second states upon said output indication by said chamber means.

8. The system claimed in claim 7 wherein said chamber means includes a cooking vessel having an overflow port for issuance of cooking liquid therefrom and wherein said second means includes a valve connected to said over-flow port.

9. The system claimed in claim 7 wherein said cooking vessel includes an inlet and an outlet and wherein said first means includes a pump, a valve and conduit means for connecting said pump and first means valve between said inlet and outlet.

10. The system claimed in claim 9 wherein said conduit means includes means for filtering cooking liquid flowing therethrough.

11. The system claimed in claim 9 wherein said conduit means includes electrical heater means for heating said cooking liquid and temperature-responsive means for detecting the temperature of said cooking liquid.

12. The system claimed in claim 9 wherein said source includes means for filtering said cooking liquid, said conduit means including a branch extending from said source filtering means to said first means valve.

13. The system claimed in claim 8 further including a closure member for said vessel, said closure member supporting said food parts, said vessel supporting switch means for operation by said closure member on such vessel closing and thereby providing said output indication.

* * * * *